Aug. 20, 1957 R. M. WHITENACK 2,803,758
TRANSISTOR AMPLIFIER CLIPPING CIRCUIT
Filed Sept. 30, 1954
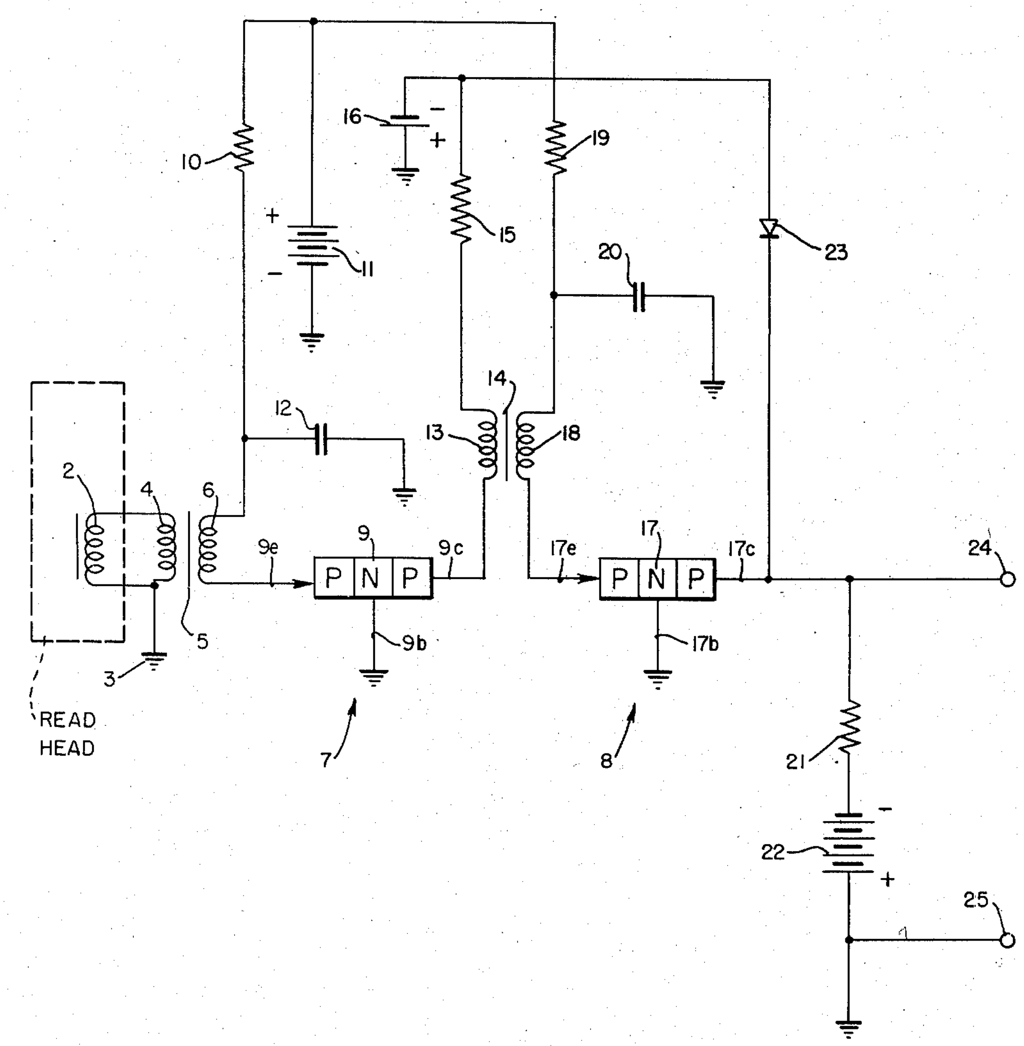
INVENTOR.
RAY M. WHITENACK
BY P. E. Henninger
ATTORNEY

1

2,803,758

TRANSISTOR AMPLIFIER CLIPPING CIRCUIT

Ray M. Whitenack, Hyde Park, N. Y., assignor to International Business Machines Corporation, New York, N. Y., a corporation of New York Application September 30, 1954, Serial No. 459,470

1 Claim. (Cl. 307—88.5)

The present invention relates to transistor amplifier circuits, and particularly to an amplifier circuit for use in cooperation with a magnetic pickup head for reading magnetic bits stored on a drum or tape.

When it is desired to read bits of data stored magnetically on a drum or tape, the drum or tape is moved past a read head containing a pickup coil in which an electromotive force is induced, depending upon the intensity of the magnetic field stored on the drum or tape. The electromotive force obtainable from such a pickup coil with magnetic fields of the intensity commonly used in data storage devices, for example, in high speed computers, is of the type commonly termed a "small signal," being on the order of microvolts. It is desirable to amplify this signal to translate it into a so-called "large signal" on the order of volts.

An object of the invention is to provide an amplifier for translating a small signal into a large signal.

Another object is to provide a transistor amplifier circuit which may be used in connection with the read head of a magnetic storage device.

The foregoing objects of the invention are attained in the circuit illustrated and described herein, which comprises two amplifier stages, each including a junction transistor having a grounded base, an emitter input and a collector output. A first impedance matching transformer couples the pickup coil of the read head to the input of the first stage, and a second impedance matching transformer couples the two stages.

Other objects and advantages of the invention will become apparent from the following specification and claim, taken together with the accompanying drawings.

The single figure of the drawing is a wiring diagram of an amplifier circuit embodying the invention.

Referring to the drawing, there is shown diagrammatically a read head 1 of a magnetic data storage device. Read head 1 includes a pickup coil 2. Pickup coil 2 is connected in a loop circuit which is grounded at 3 and which includes the primary winding 4 of an impedance matching transformer 5, having a secondary winding 6.

The amplifier circuit includes two stages, respectively generally indicated by the reference numerals 7 and 8. Stage 7 includes a PNP junction transistor 9 having an emitter electrode 9*e*, a base electrode 9*b* and a collector electrode 9*c*. The base electrode 9*b* is connected to ground.

Emitter electrode 9*e* is connected to a series circuit including the secondary winding 6 of transformer 5, a resistor 10 and a battery 11 in series. A capacitor 12 is connected between ground and the common terminal of secondary winding 6 and resistor 10. Collector 9*c* is connected to a series circuit including a primary winding 13 of an impedance matching transformer 14, a resistor 15 and a battery 16.

2

Stage 8 includes a PNP junction transistor 17 having an emitter electrode 17*e*, base electrode 17*b* and a collector electrode 17*c*. The base electrode 17*b* is connected to ground. Emitter electrode 17*e* is connected to a series circuit including a secondary winding 18 of the transformer 14, a resistor 19 and the battery 11. A capacitor 20 is connected between ground and the common junction of resistor 19 and secondary winding 18. Collector 17*c* is connected through a load resistor 21 and a battery 22 to ground. A clamping circuit is connected to collector 17*c*, including a diode 23 and the battery 16.

Output terminals 24 and 25 are respectively connected to the collector 17*c* and to ground.

The impedance matching transformer 5 adapts the impedance of the read coil 2 to the impedance of the emitter 9*e* of transistor 9. The transformer 5 must be capable of linear operation for the particular range of values of the bias current which is continuously flowing through the secondary winding 6. Resistors 10 and 15 in the circuit of stage 1 are chosen to give the proper operating point on the transistor characteristics for Class A operation. Resistor 15 should also have lower impedance than the primary winding 13. For example, the value of resistor 15 may range from zero to one-tenth of the open circuit impedance of the transformer primary. The sole purpose of this resistor is to make the circuit adaptable to a wider range of transistor parameters.

Capacitor 12 should be selected to allow maximum signal input without undue oscillation. The value of capacitance selected is determined by (1) the operating frequency of the system; (2) the effective impedance of the emitter input circuit; and (3) physical packaging limitations on the capacitor size. The impedance of the capacitor 12 should be somewhat smaller than the input impedance for optimum electrical conditions. In the specific circuit for which values are given in the table below, the operating frequency was about 75 kc., and the effective impedance of the capacitor was of the same order of magnitude as the input impedance. The particular capacitor used was selected on the basis of a compromise involving the physical size of the capacitor . A somewhat larger value of capacitance is indicated for optimum electrical results.

The circuit shown operates well at frequencies varying from the audio range to 100 kc.

The resistors in stage 8 are chosen with similar limitations as the corresponding circuit elements in stage 7. The diode clamp is provided to limit the maximum output signal and to assist in providing a square output signal, which is desired for most computer applications, whereas the signal supplied by the read head coil 2 has rounded corners and may be considerably more sinusoidal than the desired square signal.

While I have shown the use of PNP junction transistors, it will be readily understood that NPN transistors may be used providing the necessary changes, such as reversal of battery polarities, are made in the circuit.

The following table shows, by way of example, particular values for the potentials of the various batteries and impedances for the various resistors and capacitors, in a circuit which has been operated successfully. In some cases, these values are also shown in the drawing. These values are set forth by way of example only and the invention is not limited to these values nor to any of them. No value is given for the asymmetric impedance element which may be considered to have substantially no impedance in its forward direction and substantially infinite impedance in its reverse direction.

TABLE I

| | |
|---|---|
| Transformer **5** | 3 to 1 primary to secondary. |
| Coil **2** | 600 ohms at operating frequency. |
| Resistor **10** | 27K ohms. |
| Battery **11** | 45 volts. |
| Capacitor **12** | .1 mfd. |
| Transformer **14** | 12 to 1 primary to secondary. |
| Resistor **15** | 100 ohms. |
| Battery **16** | 8 volts. |
| Resistor **19** | 30K ohms. |
| Capacitor **20** | .01 mfd. |
| Resistor **21** | 22K ohms. |
| Battery **22** | 45 volts. |

While I have shown and described a preferred embodiment of my invention, other modifications thereof will readily occur to those skilled in the art, and I therefore intend my invention to be limited only by the appended claim.

I claim:

An amplifier for producing a large, relatively square output signal in response to a small, relatively sinusoidal input signal, comprising two stages, each stage including a transistor having a grounded base electrode, an emitter electrode, and a collector electrode, sinusoidal signal input means connected to the emitter electrode of the first stage, first load means connected between the collector electrode of the first stage and ground, said load means including interstage coupling means and a load impedance connected in series with a first source of unidirectional electrical energy, means connecting said interstage coupling means to the emitter electrode of the second stage, second load means connected between the collector electrode of the second stage and ground, said second load means comprising, in series, a second load impedance and a second source of unidirectional electrical energy, said first and second sources having, respectively, relatively small and large potentials, clamp means for limiting in one direction the potential swing of the second stage collector electrode, comprising a diode connected between said second stage collector electrode and the ungrounded terminal of said first source, and signal output means connected to said second stage collector electrode.

References Cited in the file of this patent

UNITED STATES PATENTS 2,647,957 Mallinckrodt ............ Aug. 4, 1953

OTHER REFERENCES

Shea text—"Principles of Transistor Circuits," pp. 132–134 and 148, published 1953, by John Wiley & Sons, New York city.